(12) United States Patent
Gruber et al.

(10) Patent No.: US 8,085,797 B2
(45) Date of Patent: Dec. 27, 2011

(54) METHOD AND SYSTEM FOR ADDRESSING AND ROUTING IN CODED COMMUNICATIONS RELATIONSHIPS

(75) Inventors: Ingo Gruber, Munich (DE); Torsten Langguth, Unterhaching (DE); Henrik Schober, Woerth (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 182 days.

(21) Appl. No.: 12/279,958

(22) PCT Filed: Sep. 3, 2007

(86) PCT No.: PCT/EP2007/007675
§ 371 (c)(1),
(2), (4) Date: Aug. 19, 2008

(87) PCT Pub. No.: WO2008/031515
PCT Pub. Date: Mar. 20, 2008

(65) Prior Publication Data
US 2009/0097416 A1    Apr. 16, 2009

(30) Foreign Application Priority Data

Sep. 14, 2006 (DE) .................. 10 2006 043 156
Jan. 12, 2007 (DE) .................. 10 2007 001 831

(51) Int. Cl.
*H04L 12/56* (2006.01)
(52) U.S. Cl. ................................. 370/401
(58) Field of Classification Search ............ None
See application file for complete search history.

(56) References Cited

U.S. PATENT DOCUMENTS

| | | | |
|---|---|---|---|
| 6,751,729 B1 * | 6/2004 | Giniger et al. | 713/153 |
| 2002/0083344 A1 | 6/2002 | Vairavan | |
| 2002/0186698 A1 | 12/2002 | Ceniza | |
| 2003/0093563 A1 | 5/2003 | Young et al. | |
| 2003/0135616 A1 * | 7/2003 | Carrico et al. | 709/225 |
| 2003/0147403 A1 * | 8/2003 | Border et al. | 370/395.53 |

(Continued)

FOREIGN PATENT DOCUMENTS

EP    1 591 862    11/2005

OTHER PUBLICATIONS

Kent, "Security Architecture for the Internet Protocol," IETF RFC, 4301:1-101 (2005).
International Search Report for PCT/EP2007/007675 dated Jul. 12, 2007.

*Primary Examiner* — Yong Zhou
(74) *Attorney, Agent, or Firm* — Marshall, Gerstein & Borun LLP

(57) ABSTRACT

The invention relates to a method and system for addressing and routing in coded communications relationships in at least two different network levels of a network with different routing levels, which are separated from one another. A first network level with the associated first routing level is demarcated from a second network level with a second routing level via at least one coding device. A network topology of both network levels is determined independently of one another in the at least two routing levels and stored respectively in routing tables. An interface in the at least one coding device is provided with an unambiguous allocation of addresses of the second routing level to addresses of the first routing level, in order to derive the topology of the second network level efficiently from the first network level.

23 Claims, 6 Drawing Sheets

U.S. PATENT DOCUMENTS

| | | | |
|---|---|---|---|
| 2004/0203797 A1* | 10/2004 | Burr ............................... | 455/445 |
| 2005/0091482 A1 | 4/2005 | Gray et al. | |
| 2005/0157730 A1 | 7/2005 | Grant et al. | |
| 2006/0140136 A1* | 6/2006 | Filsfils et al. ................. | 370/255 |
| 2007/0214359 A1* | 9/2007 | Williamson .................. | 713/163 |

* cited by examiner

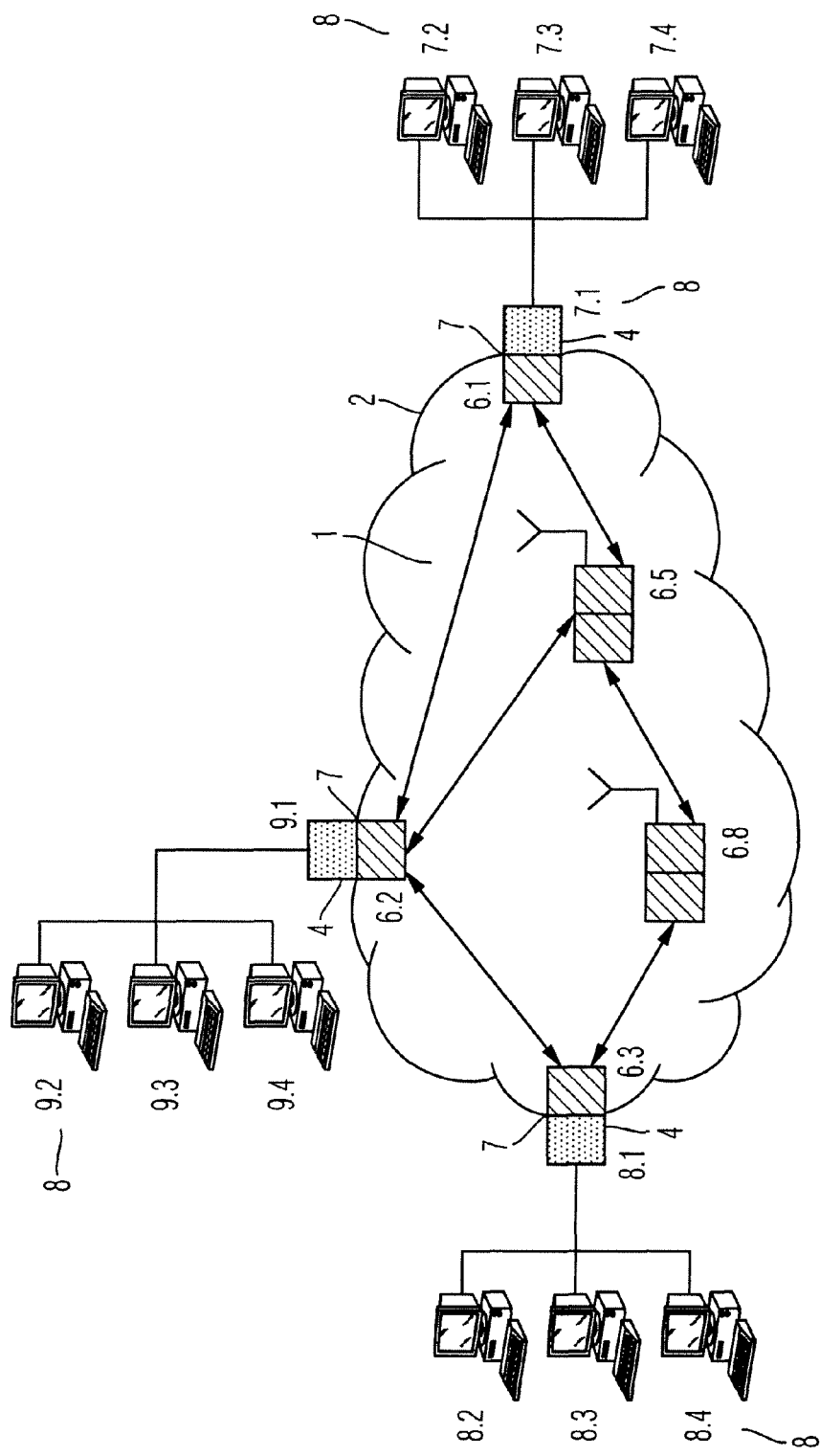

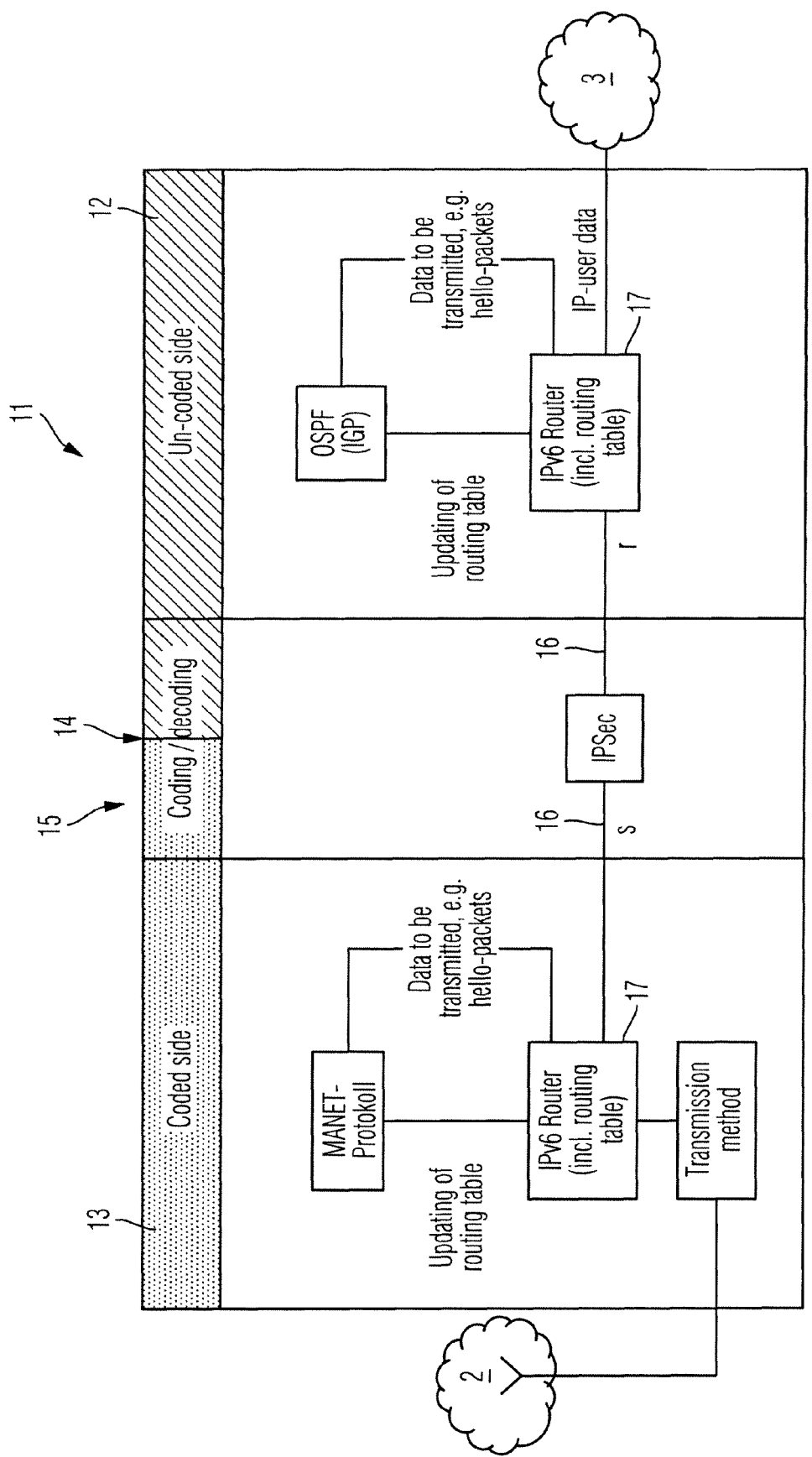

METHOD AND SYSTEM FOR ADDRESSING AND ROUTING IN CODED COMMUNICATIONS RELATIONSHIPS

BACKGROUND OF THE INVENTION

Related Technology

Future generations of radio equipment will have significantly more flexible applications opportunities than existing radio devices. This flexibility will be achieved through the concept of "software defined radios" (SDR). SDRs create the possibility of loading radio technologies (waveforms) as software and of changing the configuration of the waveforms and the radio equipment in a flexible manner via software control. The modelling of radio-transmission methods in this context can also support the transmission of data packets according to the Internet Protocol (IP) standard. This allows the use of standard IP applications and known concepts, which are also used for the internet.

Dependent upon the security requirements, sensitive information must be capable of being transmitted in coded manner (communications security, COMSEC). This can be achieved, for example, through the use of the IPsec standard, which is described in S. Kent, K. Seo, "Security Architecture for the Internet Protocol", IETF RFC 4301, December 2005.

This standard allows two different transmission methods for the coded information: the transport mode and the tunnel mode, as presented in FIG. 1. In the transport mode, only the user data of the IP packet are coded, while the IP header (inter alia, including the IP addresses of the sender and the recipient) is not changed. In the tunnel mode, the entire, original IP packet is coded and a new header is added. The new header contains the address of the coding device as the source address rather than that of the original source node. In exactly the same manner, the target address in the new header is that of the coding device rather than that of the actual receiver device. This effectively prevents a potential attacker from detecting a communication taking place between communicating partners on the basis of the source and target address. The potential attacker perceives only that data are being exchanged between the two coding devices. The actual final users in the data traffic remain concealed from the attacker.

The tunnel mode is used for security-relevant and confidential communication. In the tunnel mode, two network levels, which are completely separate from one another, are formed. The red level is the confidential level. Only authorised persons have access to a red network. By contrast, the black network represents a publicly-accessible network and can therefore be classified as non-secure. Confidential information can be transmitted from a red network via a black network only in a coded manner. These networks initially have no information about one another as a result of the strict use of the tunnel mode. From the point of view of the red network level, the tunnel mode represents a transparent tunnel through to another red network and conceals the black network level existing behind it. FIG. 1 illustrates this fact. The users A and D have no knowledge of potentially-existing, additional network users X and Y, which participate in the routing of the data between B and C.

However, this complete separation also has a disadvantageous effect on the overall network architecture. Information must be available in the coding devices regarding which red networks are connected to a black decoding device. This is necessary so that the appropriate black target address can be entered in the newly-generated IP headers in the tunnel mode.

Several network users are combined in a communications network. As shown in FIG. 2, several terminal devices can use the same coding device. Each coding device has both a confidential red address and also a public black address. The terminal devices of a confidential sub-network transmit data in an un-coded manner to the coding device. This encodes the data in the tunnel mode and routes the data via a non-secure communications connection to the receiving coding device, where the data are decoded and routed to the receiver.

The black addresses of the coding devices in a network are determined automatically by a protocol with address auto-configuration. A conventional routing protocol is used for routing within the black network hierarchy. The exchange of signalling information ensures consistency of the topology within the black network. However, to allow a connection of terminal devices, it must also be possible to exchange data between the red network and the black network. This, once again, presupposes knowledge of the address mapping between the black and red addresses of the coding device. However, the IPsec channel mode used prevents a direct mapping of the known black addresses onto the red addresses. Accordingly, a simultaneous routing in both networks is no longer possible. The IPsec discovery protocol, for example, can be used for an automatic exchange of red-network routing information between coding devices.

A brief introduction to the addressing of IP networks is provided below by way of explanation of the solution presented according to the invention and the problems of the existing, prior-art solution.

An unambiguous identification of the final users is required in order to transmit data between two users in the global internet. The routing nodes can then determine the optimum route between transmitter and receiver with reference to the target address, without a need for the transmitter to know the precise route. In order to identify a user unambiguously, an address consists of a network identifier and a device identifier. The network identifier identifies the network, in which the user is disposed, while the device identifier determines the individual user within a network. In this context, the overall address is formed by combining the two address components, as illustrated in FIG. 3.

All the devices within a network use the same network identifier, while the device identifier is different in each case. Accordingly, it is necessary for final users to change their network identifier, as soon as they implement a change of network. This is necessary so that the new connection of the terminal device does not need to be signalled to every routing node in the internet and so that a direct connection to the network can be made with reference to the network identifier. The network identifier of a terminal device is required for routing within the global network.

The device identifier must be individual and unambiguous for every device participating in the global network. For example, it can be based on the MAC address of the network card, but may also be generated from another parameter. Accordingly, a device can already be identified unambiguously with reference to the device identifier. It is constant and does not change over time.

Through the routing protocol of the black network, the coding devices only have knowledge of the black addresses of all users participating in the network. In order to establish a secure connection between final users, each of which are disposed within a red network, the unambiguous and confidential allocation between the black addresses of the decoding device and the red network connected to it must first be implemented. This allocation of the red and black addresses can be determined using the IPsec discovery protocol. A flow chart for this protocol is illustrated in FIG. 4 and describes the authentication on the basis of certificates. However, this is also possible using previously-exchanged keys (pre-shared keys, PSK). This procedure will not be described in greater detail here.

In order to obtain the confidential mapping between a black address and a red address of a coding device, the coding device A transmits a "hello probe" message to a specially-provided multi-cast address. Every user participating in the network therefore receives this message. The message contains the security certificate of the coding device A with a valid signature from the certification authority. The certificate also contains the key of the coding device A. After the receipt of the message, the coding device B checks the authenticity of the certificate using the root certificate from the certification authority and authenticates it using the signature or the key of the coding device A. After a successful authentication, the coding device B transmits a "hello reply" message back to the coding device A. This contains the same information from coding device B. After this information has been checked by coding device A, the security-association negotiations (SA negotiations), which, inter alia, specify the cryptoalgorithm and the duration of validity for the authentication and the key, are initiated. Since the mutual red addresses are so far not known to the communicating partners, the SA negotiations cannot be implemented in the IPsec tunnel mode, but must be implemented in the IPsec transport mode. Accordingly, the IP header of the data packets is transmitted between the coding devices in an un-coded manner, and only the actual content of the data packet is coded. After successful negotiations by the SA, the coding devices can transmit their red addresses in coded manner in the IPsec transport mode. Only after this procedure is it possible to set up a tunnel connection between the coding devices.

In order to communicate with a special user of another red network, a hacker-proof tunnel must first be set up between these two red networks. This requires knowledge of the responsible coding device for the respective terminal device and the red networks connected to it. Since the IPsec discovery protocol supports only a sequential exchange of mapping information with each individual coding device, tunnels must be set up in pairs between all coding devices, in order to obtain a complete knowledge of the address allocations of every coding device in the network. Accordingly, in the worst-case, in order to establish a connection to a previously-unknown red user, the IPsec discovery protocol must be used with all possible coding devices. The cost for the coding device of the source therefore increases in a linear manner with the number of coding devices N: cost ~O(N). If new coding devices and their connected networks are to be included in the overall network, the IPsec discovery protocol must therefore be executed with every other coding device. As a result, the potential signalling cost for the overall network increases according to $O(N^2)$.

In addition to the cost for the identification of the red terminal devices within its own network, the IPsec discovery protocol must also be executed in the event of a change of network. As already described, a change of network requires a change of the network identifier, so that the overall address of the coding device is also changed. Terminal devices connected to the coding device are therefore no longer identifiable within the new network. Accordingly, the IPsec discovery protocol must again be executed with every further coding device in the new network, so that every device knows the secret address allocation of every other device.

This behavior is particularly critical in radio networks. In an environment with limited radio resources, increased stabilization costs resulting from the IPsec discovery protocol are critical, especially where the environment is highly dynamic and the topology changes frequently. Moreover, a frequent change of network by individual devices, that is to say, by coding devices together with terminal devices, can occur especially in radio environments. The number of passes of the IPsec discovery protocol required can burden radio resources even further in this context, so that a meaningful communication of applications may no longer be possible in radio environments using the tunnel-coding mode, because the signalling-data traffic has increased to such an extent.

SUMMARY OF THE INVENTION

The invention therefore provides a method and a system for secure communication, which allows good data security and system availability with low signalling costs.

Accordingly, the invention provides a method for addressing and routing in coded communications relationships in at least two different network levels with different routing levels, which are separated from one another within a network, wherein, in each case, a first network level with the associated first routing level is demarcated from a second network level with a second routing level via at least one coding device, wherein a network topology of both network levels is determined and stored independently from one another in respective routing tables in the at least two routing levels, and wherein an interface with an unambiguous allocation of addresses of the second routing level to addresses of the first routing level is provided in the at least one coding device.

The invention further provides a system for addressing and routing in coded communications relationships within a network with at least two different, mutually-separate network levels and the associated routing levels, wherein, in each case, a first network level with the associated first routing level is demarcated from a second network level with a second routing level via at least one coding device, wherein the network topology of both network levels is stored in separate domains of the system, and wherein an intermediate domain, which is disposed between the separate domains as a protocol instance with two bi-directional communication routes, is provided.

The invention proposes an efficient method for obtaining current routing information on the basis of unambiguous allocations between red network addresses and black device identifiers. These allocations can be described, for example, by unambiguous functions or via a look-up table. The method avoids the laborious and resource-intensive exchange of signalling and routing messages in order to obtain the current red network topology and the corresponding routing information. This information can be derived directly using the unambiguous allocation of black device identifiers to red network addresses. If a device is known in the black network with its black device identifier, it is possible to infer the red network connected to this user immediately via the allocation.

The concept of the look-up tables makes use of a table initially configured in advance and stored in the coding device for the allocation between black device identifiers and red networks. The use of the method according to the invention means that the IPsec discovery protocol is not required, and the signalling traffic necessary for an exchange of routing information between the users' red networks can be avoided. In particular, in radio environments with limited radio resources, the availability of the radio network can be significantly increased by not using the IPsec discovery protocol.

BRIEF DESCRIPTION OF THE DRAWINGS

An exemplary embodiment of the invention is explained below with reference to the drawings. The drawings are as follows:

FIG. 2 shows the topology of a network using the IPsec tunnel mode;

FIG. 3 shows the addressing scheme in IP networks;

FIG. 8 shows an exemplary embodiment of the system according to the invention for addressing and for routing in coded communications relationships.

DETAILED DESCRIPTION

In view of the separation of the confidential, red network level (abbreviated below as the red-network level) from the black, public-network level (abbreviated below as the black-network level) by means of the coding device 4, the network topology in the routing tables 17 of the corresponding routers must first be mapped in both network levels independently of one another. Since the black routing tables 17 always contain all of the information about the users in the black, public network 2, it is possible to reduce the signalling messages by also exploiting this information on the red, confidential side. This can be achieved by introducing an unambiguous allocation, which describes a relationship between the black, public device identifier and red, confidential network addresses 8. This mapping describes which red networks are connected via a coding device to the black side with a given black device identifier. Knowledge regarding the accessibility of devices with an individual black device identifier therefore provides information regarding the red networks connected to them.

This concept can be realized, for example, through pre-configured tables in all participating coding devices 4 or through an unambiguous mapping, such as a mathematical function. An unambiguous black device identifier is used as a basis for the mapping specification. Examples of device identifiers of this kind are MAC addresses or host IDs corresponding to the IPv6 protocol.

A different picture emerges in the case of black, public addresses. Within a black, public network 2, all users must use the same network identifier. This network identifier is changed by a change of network. Accordingly, the black, public network identifier is not suitable for an identification of a coding device 4. However, an unambiguous device identifier, for example, the IPv6-interface ID based on the 48 bit MAC address, does allow an identification of the coding device 4 in any required network environment.

Figure 1:
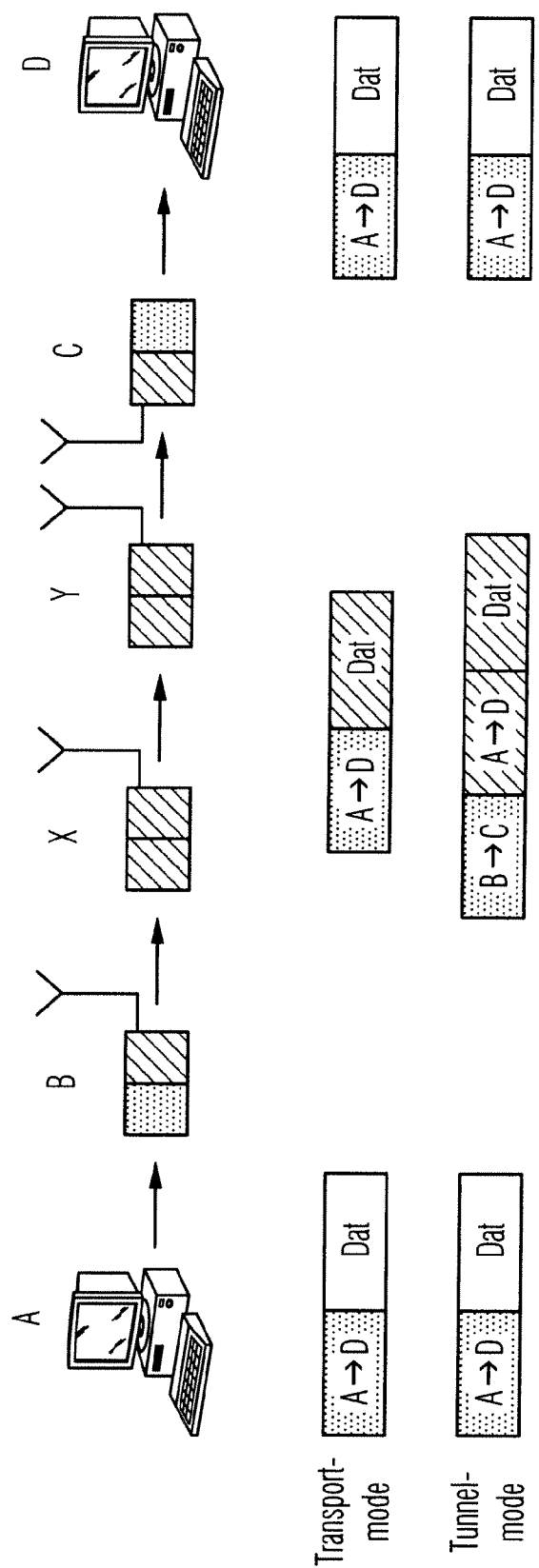
FIG. 1 shows the transport mode and tunnel mode with IPsec.
Figure 4:
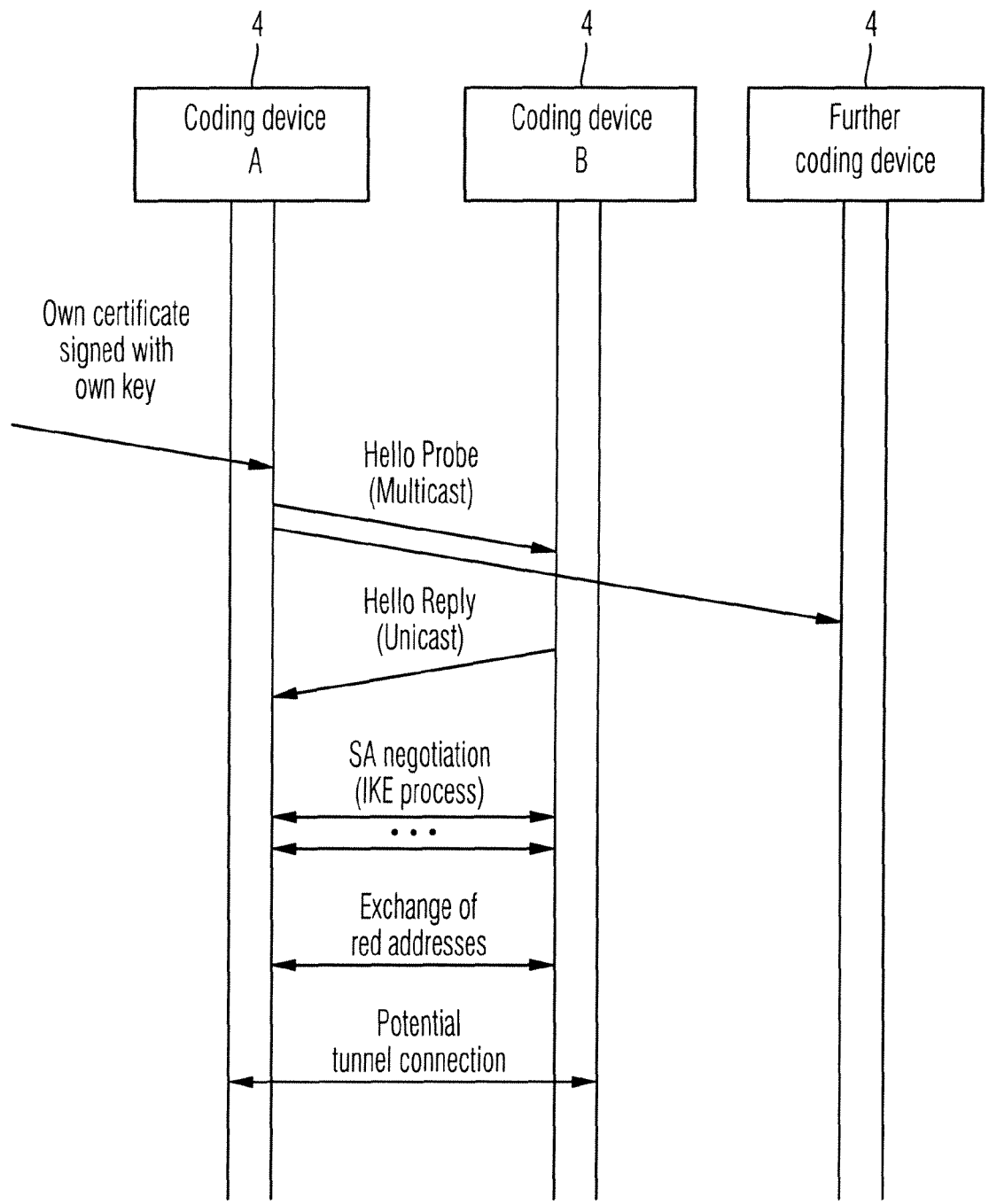
FIG. 4 shows the flow chart of the IPsec discovery protocol.
Figure 5:
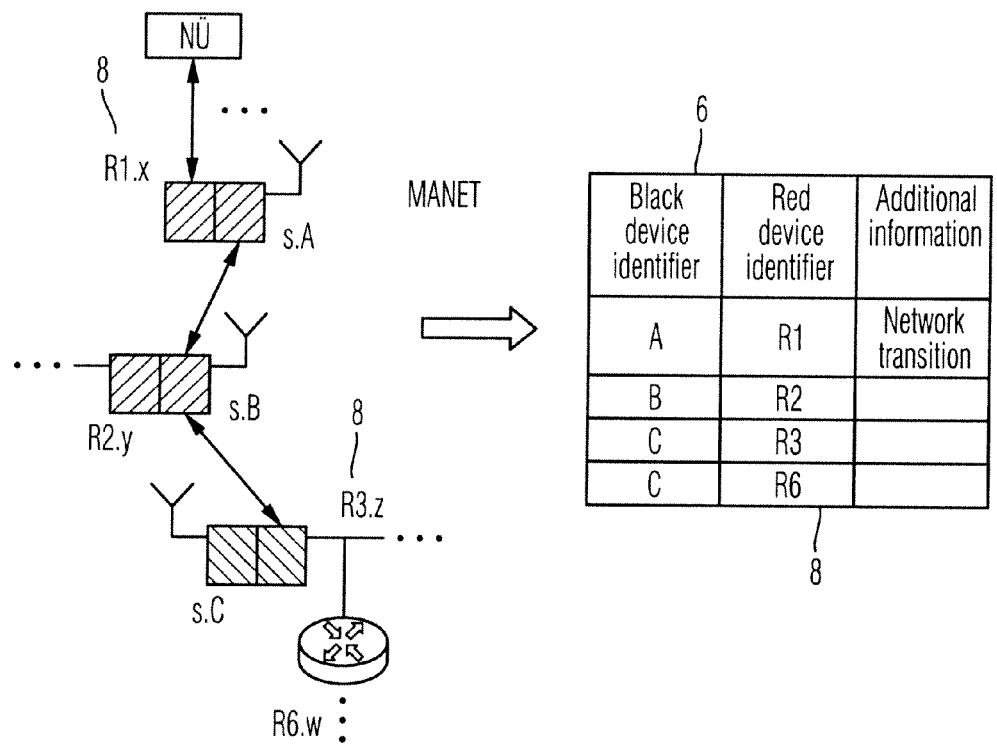
FIG. 5 shows the look-up table in the coding device for mapping between black and red addresses.

Accordingly, the connected network on the red side 3 can be identified using the black device identifier. FIG. 5 illustrates the relationship between the black—non-confidential—and red—confidential—address components 8 with reference to an example. Because of the security requirements for the coding device 4, the information in the look-up table 6 or respectively the routing table 17 must never be distributed in the black, public network 2, but may be evaluated only inside the coding device 4.

Accordingly, the information for setting up the table in every coding device 4 must be pre-configured before putting into operation. The number of table entries can become large in view of the mobility of the coding devices 4 together with their connected networks, for example, within a radio network, as well as their inclusion in different regional networks. Accordingly, sufficient memory must be provided in the coding device 4 to accommodate the tables.

Further red, confidential networks 3 connected to a coding device 4 can be marked and made known with an additional entry in the look-up table 6. In FIG. 5, for example, this is network w in router R6.

Further networks can normally be reached via network interfaces NÜ within the home network. In this context, the addresses of the network interfaces are known within the network via a protocol. Accordingly, each user can identify the network interfaces directly with reference to their black, non-confidential addresses. However, a simple signalling of the address is not possible if a network interface is positioned within the red, confidential network 3 of a coding device 4. This problem is resolved by an additional item of information within the look-up table 6 regarding the responsible coding device 4 of the network interface. Additional signalling is therefore not required in order to detect the network interface. The establishment of a tunnel to these important network users is therefore possible without difficulty.

In addition to avoiding heavy signalling traffic within the network, the concept for the exploitation of look-up tables 6 allows an updatable consistency of the black, public and red-confidential networks 2, 3. As soon as the black routing protocol recognises the non-accessibility of a user in the black network 2, this can be signalled to the coding device 4. Once again, the coding device can infer the red, confidential address 8 of the non-accessible user from the table. The routing table 17 of the red terminal device can therefore be updated directly. Accordingly, data packets can be rejected directly within the router. An exchange of routing information between the red networks connected to the different coding devices is therefore completely unnecessary. The red, confidential network 3 rapidly and automatically identifies the basic topology of the black public network 2.

Having described the structure of the look-up table 6 in principle, the following section explains in outline the procedure for data-processing and acquisition of information using the look-up table 6.

Figure 6:
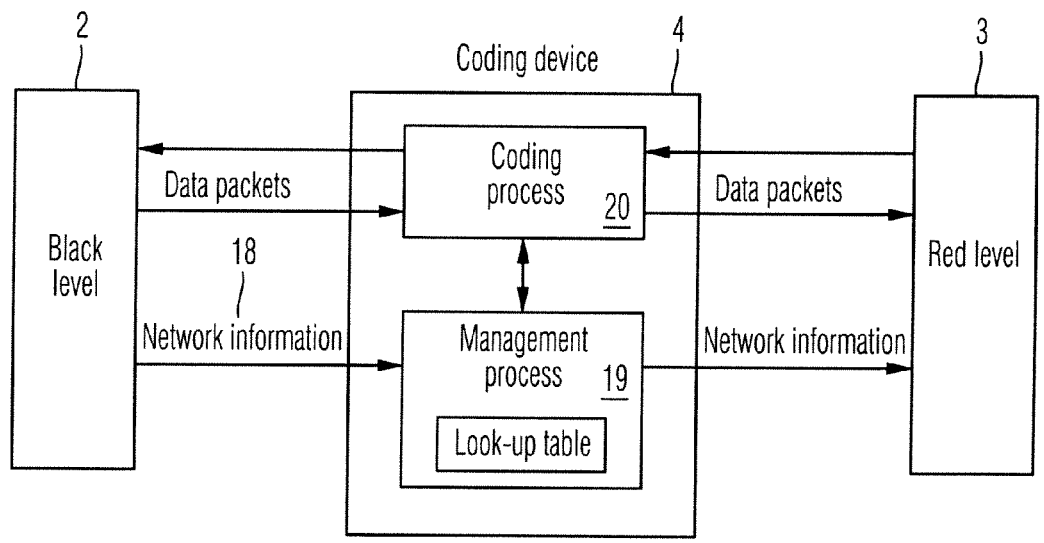
FIG. 6 shows the internal structure of the coding device with the look-up table.

FIG. 6 shows the schematic structure of the coding device 4. The black, public side 2 of the coding device 4 contains continuous routing information, that is to say, network information 18, from the black, public level 2 of the network. Using the exchanged black, public device identifiers for the other coding devices 4, the management process 19 can identify the respectively-connected red, confidential networks 3 in the look-up table. This network information 18 is routed by the management process 19 to the red, confidential level 3. Accordingly, the coding device 4 receives information regarding the accessibility of other connected red networks 3.

The red, confidential routers 17 are therefore immediately able to identify all potentially-accessible red networks 3. The topology of the black, public level 2 is mapped in an on-going manner onto the topology of the red network 3. Accordingly, on the one hand, large signalling costs can be saved. On the other hand, a non-accessibility of a special coding device and its connected terminal devices can be identified immediately, and, if required, an appropriate response can be made. A coding process 20 within the coding device ensures that the data packets travelling towards the red, confidential layer 3 are decoded and those travelling towards the black level are coded.

The second advantage of this method is obtained with regard to the coding of red, confidential data from the red, confidential level. The coding process 20 can immediately infer the responsible decoding device of the target terminal device using the look-up table 6. A cost-intensive pass through the IPsec discovery protocol is not required. Provided the decoding device is indexed in the look-up table 6 and connected to the network, the data stream can be coded and routed practically without delay.

In order to keep the size of the look-up tables 6 to a minimum, the red, confidential networks 3 connected to the coding device 4 can use hierarchical addressing. This means that the addresses of all terminal devices originate from the same address domain, even if additional routers separate the individual networks. This avoids the need for several table entries for one coding device, as presented in FIG. 5. With hierarchical addressing, all connected terminal devices of a coding device 4 can be combined under one address entry 8 and entered into the look-up table 6.

A periodic exchange of the look-up tables 6 between coding devices 4 is also possible. For this purpose, one coding device 4 must establish a hacker-proof tunnel with another coding device 4. The table 6 can then be adjusted via this tunnel. This has the advantage that changes to the configuration of the table 6 can still be implemented during the delay time of the coding devices 4. Accordingly, the coding device 4 at gateway 21, for example, can distribute additional red, confidential network addresses within the network. Moreover, the configuration costs necessary prior to putting into operation can be minimised, because the information in the look-up table 6 can also be made accessible even during operation.

The signalling necessary during the course of the IPsec discovery protocol is a significant factor. Especially in radio environments with limited data rates, this factor additionally reduces the available transmission capacity. The use of the IPsec discovery protocol can be dispensed with completely in the coding devices 4. The connected red, confidential networks 3 can be derived from the topology of the black, non-confidential network 2 after a short time using the lookup table 6. This additionally reduces the waste of network resources, because the non-accessibility of the coding devices and connected red networks is already identified in the transmission device or in the coding device 4.

If a hierarchical addressing of the red, confidential networks 10 continues to be used, the parameters of the necessary look-up tables 6 can be further reduced. Additional adjustment during operation is possible with the exchange of the tables 6 between individual coding devices 4. Accordingly, the configuration costs prior to putting into operation can be significantly reduced, because all entries need not be preconfigured.

Figure 7:
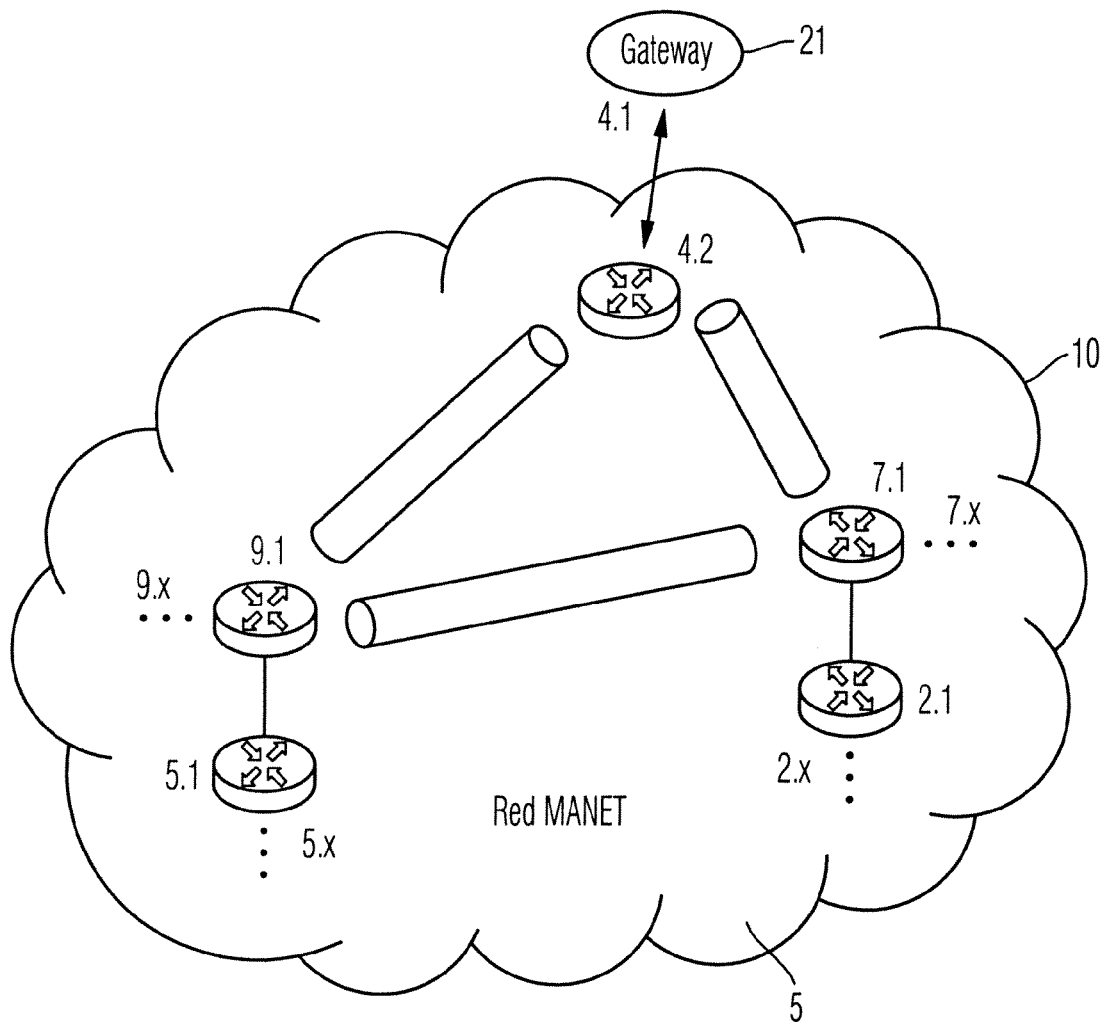
FIG. 7 shows the tunnel mode within a confidential network.

FIG. 7 shows the tunnel mode between two confidential, red networks 3, wherein the method according to the invention for addressing and routing in coded communications relationships 1 comes into effect. The communications relationships or respectively the connections between two terminal users extend to cover two different, mutually-separate network levels 2, 3, wherein the routing levels associated with the network levels 2, 3 also differ from one another. The demarcation of these two network levels 2, 3 together with the routing levels is implemented via a coding device 4, which is connected to the first network level 2, which is a publicly-accessible and non-secure, black network, and also to the second network level 3, which is a non-publicly-accessible, red network.

A current network topology is determined in each of the two routing levels, wherein the determination of the network topology of the first network level 2, 3 is implemented independently of the determination of the network topology of the second network level 3, 2, which is used for confidential communication, screened relative to the outside, and stored in the corresponding routing tables 17. In this context, an interface 7 is provided within the coding devices 4 present within the overall network with an unambiguous allocation of addresses 8 of the second routing level to addresses 8 of the first routing level, so that routing is also possible beyond the limits of the two network levels 2, 3. This is also illustrated in FIG. 2.

The first network level 2 is a public domain, such as the fixed network, or a part of a global mobile-telephone network, for example, the UMTS network or the GSM network, and the second network level 3 is a confidential domain, such as a company network screened relative to the outside, or similar, wherein the respective addresses 8 in the routing levels are also subdivided into public addresses 8 and confidential addresses 8.

During network operation, a preconfigured, updatable look-up table 6 is provided in the coding device 4 itself. The interface 7 functions as a controlled interface between public and confidential network levels 2, 3 and therefore also as a limit between public and confidential routing levels.

FIG. 8 shows an exemplary embodiment of the system 11 according to the invention for addressing and routing in coded communications relationships 1 within an overall network comprising at least two mutually-separate, different network levels 2, 3. In this context, the black network level 2 is demarcated via at least one coding device 4 from a second network level 3. The network topologies of both network levels are stored in the routing tables of the router 17 within the separate domains 12, 13 of the system 11 according to the invention.

A protocol instance 14 is provided between these two domains 12, 13 as an intermediate domain 15, wherein the protocol instance 14 provides one bi-directional communications route 16 to each of the two domains 12, 13 and, is implemented, for example, according to the IPsec standard. The first network level 2 is defined within an overall network as a public domain 2 and corresponds to a publicly-accessible network 2 such as a landline network or a mobile telephone network. The second network level 3 within an overall network is provided as a confidential domain and corresponds, for example, to a non-public, screened network 3, for example, a company network or a logistics network. The addresses in the respective network levels 2, 3 or respectively the associated routing levels are distinguishable from one another as public addresses and confidential addresses 8.

A router 17 is connected to the protocol instance 14 both on the un-coded side 12 and also on the coded side 13, in the exemplary embodiment, according to the IPv6 standard, wherein the router 17 also comprises a routing table.

The router 17 on the coded side 12 of the system 11 according to the invention is connected via a defined transmission method to a public network 2, so that a communications connection can be provided with the latter, because the implemented transmission method is compatible with the transmission method of the public network 2.

Furthermore, in the exemplary embodiment, a MANET protocol is implemented on the coded side 13, and an IGP protocol for updating the associated routing tables 6 is implemented on the un-coded side 12, wherein an OSPF algorithm is provided as the IGP. An un-coded transmission of IP user data, such as digitised speech or images, to a confidential, non-publicly-accessible network 3 is provided via the IPv6 router 17 on the un-coded side of the system 11 according to the invention.

The invention is not restricted to the exemplary embodiment described. All of the features described or illustrated can be combined as required within the framework of the invention.

The invention claimed is:

1. Method for addressing and routing in coded communications relationships in at least two different network levels with different routing levels, which are separated from one another within a network, said method comprising:
demarcating a first, public network level with the associated first routing level from a second, confidential network level with a second routing level via at least one coding device;
determining and storing a network topology of both network levels independently from one another in respective routing tables in the at least two routing levels, wherein the routing table for the first, public network level contains all of the information about the users in the first, public network level and is stored in a first public network level network device within a domain of the first, public network level, wherein the routing table for the second, confidential network level contains all of the information about the users in the second, confidential network level and is stored in a second, confidential network level network device within a domain of the second, confidential network level;
providing an interface with an unambiguous allocation of addresses of the second routing level to addresses of the first routing level in the coding device;
storing the interface between a public and a confidential network level or respectively between a public and a confidential routing level in look-up tables in the coding device before its start-up, wherein the look-up tables are stored in the coding device within the domain of a third, intermediate network level;
obtaining an updating of a confidential routing table from locally-available, time-variable information in the first, public network level using the look-up tables in the coding device; and
as a realization of a function which describes the relationship between public and confidential addresses, distributing the contents of the look-up tables exclusively within the confidential domain,
wherein the second, confidential network is derived from the topology of the first, public network using the look-up table without requiring a pass through an IPSec discovery protocol.

2. Method according to claim 1, wherein the first network level is a publicly-accessible and non-secure network.

3. Method according to claim 1, wherein the second network level is a non-publicly-accessible network screened from the outside for confidential communication.

4. Method according to claim 1, wherein the first network level is a public domain, and the second network level is a confidential domain, the addresses of the first routing level are marked as public addresses, and the addresses of the second routing level are marked as confidential addresses.

5. Method according to claim 1, comprising amending the look-up tables in the coding device during a network operation.

6. Method according to claim 1, comprising generating the mapping specification for an allocation of the confidential addresses to the public addresses in an overall network independently of the classification of the coding device.

7. Method according to claim 1, comprising as a realization of a function which describes the relationship between public and confidential addresses, pre-configuring the look-up tables in all coding devices to be used.

8. Method according to claim 1, comprising as a realization of a function which describes the relationship between public and confidential addresses, dynamically updating the look-up tables during network operation in all coding devices to be used.

9. Method according to claim 1, implementing an additional entry, which indicates further confidential networks connected to a coding device in the look-up tables.

10. Method according to claim 1, wherein a basis for the mapping specification is an unambiguous device identifier of a device connected to the network.

11. Method according to claim 10, wherein the device identifier is conceived as a MAC-address or as a host-identifier according to the IPv6 protocol.

12. System for addressing and routing in coded communications relationships within a network with at least two different, mutually-separate network levels and associated routing levels, comprising:
a first, public network level with an associated first routing level demarcated from a second, confidential network level with a second routing level via at least one coding device,
network topology of both network levels stored in separate domains of the system, and
an intermediate domain disposed between the separate domains as a protocol instance with two bi-directional communication routes,
wherein allocations between a confidential network and non-confidential device identifiers are realized as unambiguous functions or a look-up table,
wherein an interface between a public and a confidential network level or respectively between a public and a confidential routing level is stored in look-up tables in the coding device before start-up,
wherein a confidential routing table is updated from locally available time-variable information in the first, public network level using the look-up tables in the coding device,
wherein the relationship between public and confidential addresses stored in the look\-up tables is distributed exclusively within the confidential domain
wherein the routing table for the first, public network level contains all of the information about the users in the first, public network level and is stored in a first public network level network device within a domain of the first, public network level,
wherein the routing table for the second, confidential network level contains all of the information about the users in the second, confidential network level and is stored in a second, confidential network level network device within a domain of the second, confidential network level,
wherein the look-up tables are stored in the coding device within the domain of a third, intermediate network level, and
wherein the second, confidential network is derived from the topology of the first, public network using the look-up table without requiring a pass through an IPSec discovery protocol.

13. System according to claim 12, comprising a publicly-accessible, partial network provided as a first network level and defined as a public domain.

14. System according to claim 12 comprising a non-public, screened, partial network provided as the second network level and defined as the confidential domain.

15. System according to claim 12, wherein the addresses of the first routing level, as public addresses, and the addresses of the second routing level, as confidential addresses, are distinguishable from one another.

16. System according to claim 12, wherein the protocol instance is implemented in the intermediate domain according to the IPsec standard or another coding method.

17. System according to claim 12, comprising a router including a routing table connected respectively to the protocol instance both on an un-coded side in a first domain and also on a coded side in a second domain.

18. System according to claim 17, wherein the router creates a communications connection with a public network on the coded side via a defined transmission method.

19. System according to claim 18, wherein the transmission method is compatible with a public network.

20. System according to claim 17, wherein an un-coded transmission of user data into a confidential, non-publicly-accessible network is provided via the router on the un-coded side.

21. System according to claim 12, wherein a Mobile Ad-hoc Network (MANET) protocol is implemented on the coded side in order to update the associated routing tables.

22. System according to claim 12, wherein an interior gateway protocol (IGP) is implemented on the un-coded side.

23. System according to claim 22, wherein an open-shortest-path-first (OSPF) algorithm is implemented in the IGP protocol for the updating of the associated routing tables.

* * * * *